United States Patent

Sato

(10) Patent No.: US 12,474,720 B2
(45) Date of Patent: Nov. 18, 2025

(54) INFORMATION PROCESSING DEVICE, MOVABLE APPARATUS, INFORMATION PROCESSING METHOD, AND STORAGE MEDIUM

(71) Applicant: CANON KABUSHIKI KAISHA, Tokyo (JP)

(72) Inventor: Yoshihisa Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/530,507

(22) Filed: Dec. 6, 2023

(65) Prior Publication Data

US 2024/0201708 A1 Jun. 20, 2024

(30) Foreign Application Priority Data

Dec. 16, 2022 (JP) .................................. 2022-200963

(51) Int. Cl.
*G05D 1/693* (2024.01)
*G05D 1/633* (2024.01)
*G05D 107/70* (2024.01)
*G05D 109/10* (2024.01)

(52) U.S. Cl.
CPC .............. *G05D 1/693* (2024.01); *G05D 1/633* (2024.01); *G05D 2107/70* (2024.01); *G05D 2109/10* (2024.01)

(58) Field of Classification Search
CPC ......... G05D 1/693; G05D 1/633; G05D 1/622
See application file for complete search history.

(56) References Cited

U.S. PATENT DOCUMENTS

| 11,353,880 | B2 | 6/2022 | Honda et al. |
| 2019/0384307 | A1* | 12/2019 | Honda ................... B25J 9/1664 |
| 2020/0333789 | A1* | 10/2020 | Suzuki ................. G05D 1/0212 |

FOREIGN PATENT DOCUMENTS

| CN | 104501816 A | * | 4/2015 | ............. G01C 21/20 |
| JP | 2008-242859 A | | 10/2008 | |
| JP | 2010170259 A | * | 8/2010 | |
| JP | 2019-219735 A | | 12/2019 | |
| JP | 2020046779 A | * | 3/2020 | |

OTHER PUBLICATIONS

CN104501816A Machine Translation (Year: 2015).*
JP2010170259A Machine Translation (Year: 2010).*
JP2020046779A Machine Translation (Year: 2020).*

* cited by examiner

*Primary Examiner* — Scott A Browne
*Assistant Examiner* — Jisun Choi
(74) *Attorney, Agent, or Firm* — Venable LLP

(57) ABSTRACT

In order to determine a route for avoiding collision of a movable apparatus, a different movable apparatus as a target of collision is determined, different movable apparatus information that includes at least one of shape information, a current state, a performance, information regarding a task that is being performed of the different movable apparatus, and information regarding a route along which the different movable apparatus is moving is acquired, own movable apparatus information that is information regarding an own movable apparatus corresponding at least to the different movable apparatus information is acquired, a change rate of the route is acquired on the basis of the different movable apparatus information and the own movable apparatus information, and a moving route to be changed is determined on the basis of the change rate of the route.

9 Claims, 8 Drawing Sheets

FIG. 5

| Movable apparatus | Task priority | Loading amount |
|---|---|---|
| A | 1 | 10 |
| B | 4 | 5 |

FIG. 6

| Name | Variable | Specific value |
|---|---|---|
| Weight for task priority | dt | 0.4 |
| Weight for loading amount | dc | 0.6 |
| Task priority ratio | Tx | Ta=0.2 |
| | | Tb=0.8 |
| Loading amount ratio | Cx | Ca=2/3 |
| | | Cb=1/3 |

INFORMATION PROCESSING DEVICE, MOVABLE APPARATUS, INFORMATION PROCESSING METHOD, AND STORAGE MEDIUM

BACKGROUND OF THE INVENTION

Field of the Invention

The present invention relates to an information processing device, a movable apparatus, an information processing method, a storage medium, and the like for avoiding collision.

Description of the Related Art

In recent years, many automated guided vehicles have been used to enhance efficiency of work in plant production lines and transportation warehouses. A plurality of automated guided vehicles is typically used in one environment, and the automated guided vehicles often have a method for avoiding collision against each other.

According to Japanese Patent Laid-Open No. 2019-219735, movable apparatuses that may collide avoid collision by recognizing tasks that they are doing and by a robot with low task propriety stopping. Also, Japanese Patent Laid-Open No. 2008-242859 presents a method for more naturally avoiding collision by generating an artificial reactive force to avoid collision on the basis of priority of tasks of a plurality of movable apparatuses.

However, according to both Japanese Patent Laid-Open No. 2019-219735 and Japanese Patent Laid-Open No. 2008-242859, avoidance is achieved by determination regarding whether to stop and by an artificial reactive force on the basis of only the priority of tasks that are being done, and there is thus a problem that work efficiency is low.

SUMMARY OF THE INVENTION

According to an aspect of the present invention, there is provided an information processing device that determines a route for avoiding collision of a movable apparatus, the information processing device including at least one processor or circuit configured to function as: a determination unit configured to determine a different movable apparatus as a target of collision; a different movable apparatus information acquisition unit configured to acquire different movable apparatus information that includes at least one of shape information, a current state, a performance, and information of a task that is being performed of the different movable apparatus, and information of a route along which the different movable apparatus is moving; an own movable apparatus information acquisition unit configured to acquire own movable apparatus information that is information regarding an own movable apparatus corresponding at least to the different movable apparatus information; a change rate acquisition unit configured to acquire a change rate of the route on the basis of the different movable apparatus information and the own movable apparatus information; and a moving route determination unit configured to determine a moving route to be changed on the basis of the change rate of the route acquired by the change rate acquisition unit.

Further features of the present invention will become apparent from the following description of embodiments with reference to the attached drawings.

BRIEF DESCRIPTION OF THE DRAWINGS

FIG. 5 is a diagram illustrating an example of information regarding the movable apparatuses A and B.

FIG. 6 is a diagram illustrating a specific example of a variable (parameter) used to calculate a route change rate.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
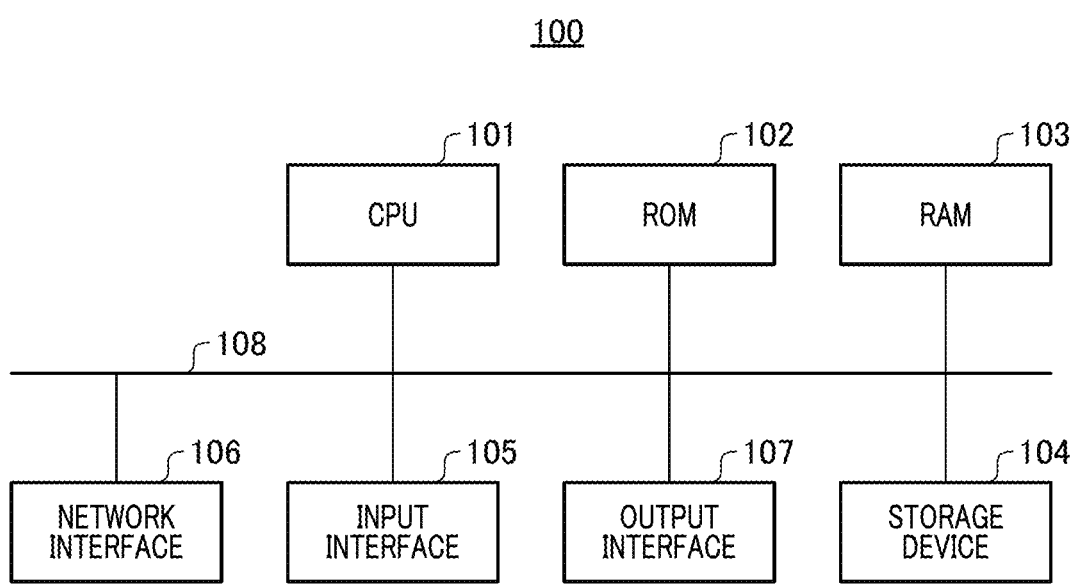
FIG. 1 is a block diagram illustrating a hardware configuration example of an information processing device according to a first embodiment of the present invention.

FIG. 1 is a block diagram illustrating a hardware configuration example of an information processing device according to a first embodiment of the present invention. Note that the information processing device according to the first embodiment may be implemented by a computer device as illustrated in FIG. 1 or may be implemented by a plurality of computer devices by distributing functions to them as needed.

In a case where the information processing device is configured of a plurality of computer devices, the computer devices are connected to each other via a local area network (LAN) or the like such that they can communicate with each other.

In FIG. 1, 101 denotes a central processing unit (CPU) that controls the entire computer device 100. 102 denotes a read only memory (ROM) that stores programs and parameters that do not need to be changed. 103 denotes a random access memory (RAM) that temporarily stores programs and data supplied from external devices and the like.

104 denotes a storage device such as a hard disk or a memory card. Note that the storage device 104 may be fixed or may be detachable/attachable. The storage device 104 includes, for example, an optical disc such as a compact disc (CD), a magnetic or optical card, an IC card, a memory card, a hard disk drive (HDD), and a solid disk drive (SDD).

105 denotes an interface with an input device such as a pointing device or a keyboard for inputting data by user's operations. 107 denotes an interface with an output device such as a display device for displaying data held by or data supplied to the computer device 100.

106 denotes a network interface for establishing connection to a network line such as the Internet. 108 denotes a system bus to which each of the units 101 to 107 is communicatively connected.

The CPU 101 serving as a computer functions as a control unit that controls operations of each part of the entire device on the basis of a computer program stored in a memory serving as a storage medium. The memory serving as a storage medium is, for example, the storage device 104 or the ROM 102.

Also, program codes may not only be executed directly by the computer but also may be processed by an operating system (OS) or the like working on the computer. Furthermore, program codes read from the storage medium may be processed by a function expanding board inserted into the computer or a function expanding unit connected to the computer.

Figure 2:
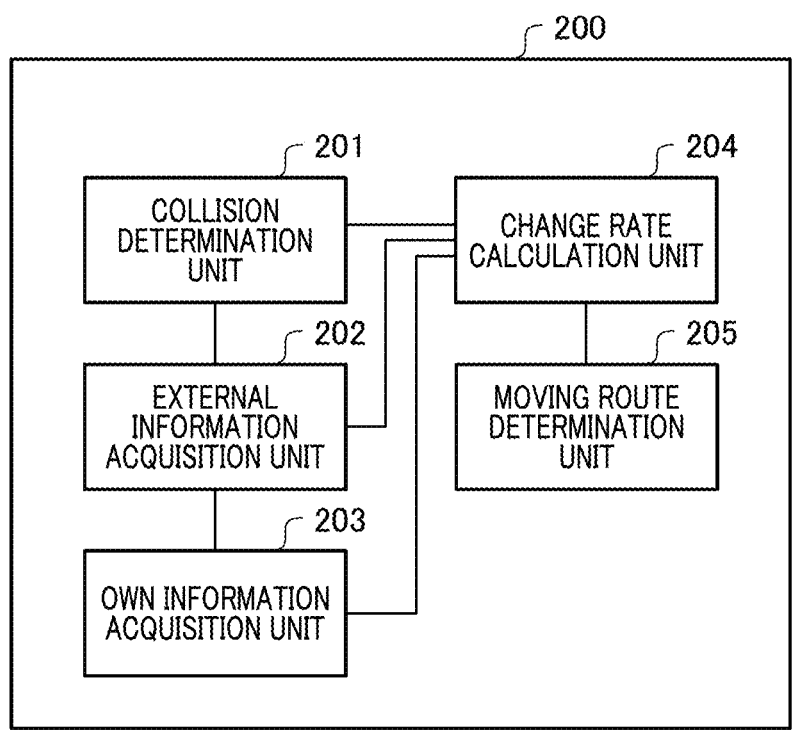
FIG. 2 is a functional block diagram illustrating a configuration example of the information processing device according to the first embodiment.

FIG. 2 is a functional block diagram illustrating a configuration example of the information processing device according to the first embodiment. Note that some of functional blocks illustrated in FIG. 2 are realized by causing the CPU 101 serving as a computer included in the information processing device to execute the computer program stored in the memory serving as the storage medium.

However, a part or an entirety thereof may be implemented by hardware. As the hardware, it is possible to use an application specific integrated circuit (ASIC), a processor (a reconfigurable processor or a DSP), or the like. Also, each of the functional blocks illustrated in FIG. 2 may not be incorporated in the same casing and may be configured by separate devices connected to each other via signal lines. Note that the above description related to FIG. 2 also similarly applies to FIGS. 7 and 8.

An information processing device 200 in FIG. 2 is mounted in a movable apparatus such as an automated guided vehicle (AGV) or an autonomous mobile robot (AMR), for example. Also, the information processing device 200 has a collision determination unit 201 that determines an expected position of collision against a different movable apparatus against which an own movable apparatus may collide and an external information acquisition unit 202 that acquires information regarding the movable apparatus as a target of collision determined by the collision determination unit 201.

Also, the information processing device 200 has an own information acquisition unit 203 that acquires information regarding the own movable apparatus and a change rate calculation unit 204 that calculates a route change rate by using information acquired from the external information acquisition unit 202.

Furthermore, the information processing device 200 has a moving route determination unit 205 that determines a moving route to be changed by using information calculated by the change rate calculation unit 204. In other words, the information processing device 200 determines a route for avoiding collision of the movable apparatus by using information acquired from the own information acquisition unit 203 and the external information acquisition unit 202.

The collision determination unit 201 determines whether collision against the different movable apparatus will occur. As a method for determining collision, the distance to the different movable apparatus in an environment is measured by using a laser sensor such as a light detection and ranging (LiDAR) or a stereo camera included in each movable apparatus, for example. Also, determination that collision will occur may be made in a case where the distance continuously decreases below a predetermined distance.

Alternatively, a predicted position after a predetermined time may be calculated from information regarding a traveling direction and a speed of the own movable apparatus itself, a traveling direction and a speed of the different movable apparatus may be acquired by using a laser sensor or a stereo camera, and a predicted position of the different movable apparatus after the predetermined time may be calculated from the information. Then, determination that the movable apparatuses will collide may be made in a case where the calculated predicted position of the own movable apparatus itself and the predicted position of the different movable apparatus overlap each other after the predetermined period.

Alternatively, determination may be made by using a central management device that manages a moving route, a current position, and a speed of each movable apparatus. In such a case, the central management device, for example, estimates predicted positions after a specific period of time from the information regarding the moving route, the current position, and the speed of each movable apparatus. Then, determination that the movable apparatuses will collide may be made in a case where the estimated predicted positions of the movable apparatuses overlap each other.

Alternatively, determination may be made by using information regarding a route of each movable apparatus at each clock time managed by the central management device. In such a case, determination that the movable apparatuses will collide may be made in a case where it is determined that the plurality of movable apparatuses will be moving in opposing directions at the same clock time along the same route.

In a case where the determination that the movable apparatuses will collide against each other is made by using one or more processes described above, the different movable apparatus against which the own movable apparatus will collide is regarded as a movable apparatus as a target of collision. Also, the point of collision is regarded as a predicted collision point. The collision determination unit 201 determines the different movable apparatus as a target of collision.

The external information acquisition unit 202 acquires information regarding the different movable apparatus as a target of collision (different movable apparatus information) determined by the collision determination unit 201. The different movable apparatus information includes at least one of shape information, a current state, a performance, and a task that is being performed of the different movable apparatus, and information regarding a route along which the different movable apparatus is moving.

Note that the shape information includes information regarding at least one of a vehicle width, a vehicle height, and a total length, and the current state of the movable apparatus includes information regarding at least one of a loading amount, a battery remaining amount, and a fuel remaining amount.

The performance of the movable apparatus includes at least one kind of information regarding a horsepower and fuel efficiency, and the information regarding the task that is being performed includes, for example, priority of a task. Note that the different movable apparatus information may include at least one of a wear rate (wear-out rate) and a schedule of the movable apparatus, a route along which the different movable apparatus is moving, a mechanism for changing directions, and the like.

As a method for acquiring the different movable apparatus information, the information may be acquired by using an external sensor, for example. In such a case, the different movable apparatus may be acquired by using a stereo camera as the external sensor, for example, to specify the movable apparatus as a target of collision from an image through image analysis and estimate the shape information of the vehicle body and the loading amount.

Also, an information presenting unit that presents information to outside may be provided in each movable apparatus, and the information presenting unit may be used to acquire information presented by the movable apparatus as a target of collision by using the external sensor. Also, a communication device or the like may be used as the external sensor to acquire information by establishing communication between the movable apparatuses. Moreover, information may be acquired from the central management device that manages information regarding each movable apparatus.

Note that the external information acquisition unit 202 functions as a different movable apparatus information acquisition unit that acquires the different movable apparatus information including at least one of the shape information, the current state, the performance, and the information regarding a task that is being performed of the different movable apparatus as a target of collision, and information regarding a route along which the different movable apparatus is moving.

The own information acquisition unit 203 acquires information regarding the own movable apparatus (own movable apparatus information) corresponding at least to the different movable apparatus information acquired by the external information acquisition unit 202. The own movable apparatus information includes at least one of shape information, a current state, a performance, and information regarding a task that is being performed of the own movable apparatus, and information regarding a route along which the own movable apparatus is moving.

The shape information includes information regarding at least one of a vehicle width, a vehicle height, and a total length, and the current state of the movable apparatus includes information regarding at least one of a loading amount, a battery remaining amount, and a fuel remaining amount. The performance of the movable apparatus includes at least one kind of information regarding a horsepower, fuel efficiency, and the like, and the information regarding the task that is being performed includes priority of a task, for example.

Note that the different movable apparatus information may include at least one of a wear rate (wear-out rate) and a schedule of the movable apparatus, a route along which the movable apparatus is moving, a mechanism for changing directions, and the like. As a method for acquisition, the information may be managed by a database, and the information may be acquired from the database, for example.

In such a case, the database may be managed by each movable apparatus, or the database may be managed by the central management device, and each movable apparatus may acquire the information from the database by using communication. Also, each movable apparatus may include a sensor for measuring the loading amount and the battery remaining amount, and the information may be acquired in real time. Note that the own information acquisition unit 203 functions as an own movable apparatus information acquisition unit that acquires the own movable apparatus information that is information regarding the own movable apparatus corresponding at least to the different movable apparatus information.

The change rate calculation unit 204 calculates a route change rate by using information acquired from the external information acquisition unit 202 and the own information acquisition unit 203. Here, the change rate calculation unit 204 functions as a change rate acquisition unit that acquires the route change rate on the basis of the different movable apparatus information and the own movable apparatus information. A method for calculating the route change rate will be described later in Step S304 in the flowchart illustrated in FIG. 3.

The moving route determination unit 205 determines a moving route to be changed by using the information calculated by the change rate calculation unit 204. Here, the moving route determination unit 205 determines the moving route to be changed on the basis of the route change rate acquired by the change rate acquisition unit. A method for determining the moving route to be changed will be described later in Step S305 in the flowchart illustrated in FIG. 3.

Figure 3:
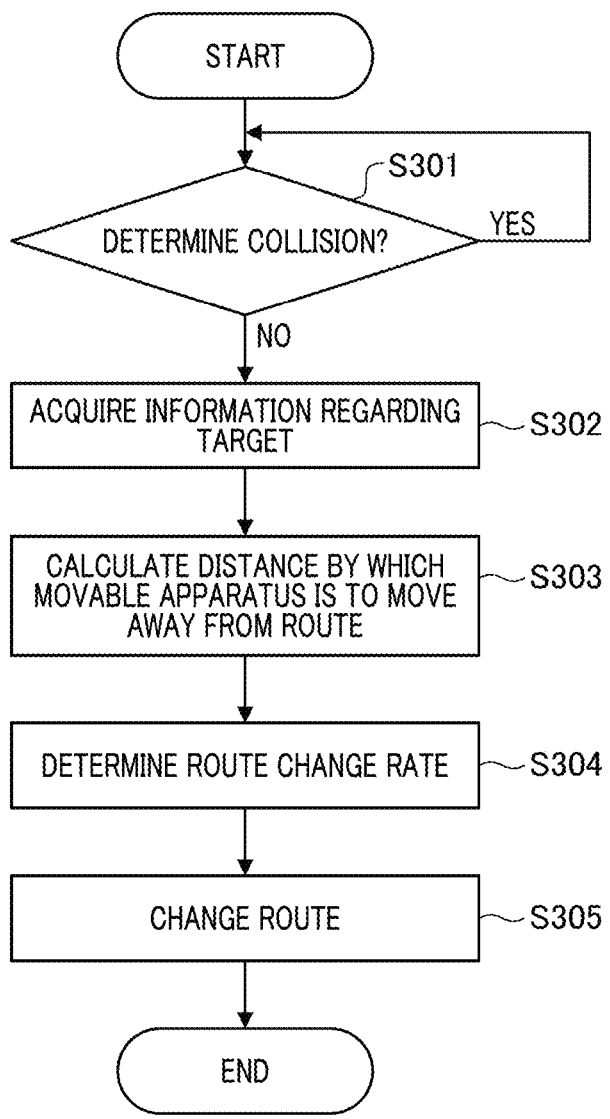
FIG. 3 is a flowchart for explaining an information processing method according to the first embodiment.

Next, FIG. 3 is a flowchart for explaining an information processing method according to the first embodiment. A basic flow in the first embodiment will be described by using the work flow illustrated in FIG. 3.

Note that an operation in each step of the flowchart in FIG. 3 is performed by the CPU 101 serving as a computer executing the computer program stored in the memory. In the information processing method illustrated in the flowchart in FIG. 3, a route for avoiding collision of the movable apparatus is determined.

In Step S301, whether or not collision against a different movable apparatus will occur is determined by using the collision determination unit 201. In a case where it is determined that collision will occur, the movable apparatus as a target of collision determined by the collision determination unit 201 and the predicted collision point are specified, and the processing then proceeds to Step S302. In a case where it is determined that collision will not occur in Step S301, the processing in Step S301 is performed again after elapse of a predetermined standby time. Here, Step S301 functions as a determination step of determining the different movable apparatus as a target of collision.

As the standby period to be set, an appropriate numerical value is set on the basis of a speed of a movable apparatus operating in the same environment and a processing speed, for example. In a case where it is possible to sufficiently avoid collision by executing collision determination processing at intervals of 1 second, for example, along with processing which will be described below, a time that is not more than 1 second is set as the standby time.

In Step S302, the external information acquisition unit 202 acquires information regarding the movable apparatus as a target of collision specified in Step S301. Here, Step S302 functions as a different movable apparatus information acquisition step of acquiring the different movable apparatus information that includes at least one of the shape information, the current state, the performance, and the information regarding the task that is being performed of the different movable apparatus, and the information regarding the route along which the different movable apparatus is moving.

In Step S303, the moving route determination unit 205 calculates the distance by which the movable apparatus is to move away from the current route in order to pass by the movable apparatus as a target of collision by using the information regarding the movable apparatus as a target of collision acquired in Step S302. Note that an own movable apparatus information acquisition step of acquiring the own movable apparatus information that is information regarding the own movable apparatus corresponding at least to the different movable apparatus information is executed to perform the calculation.

Figure 4:
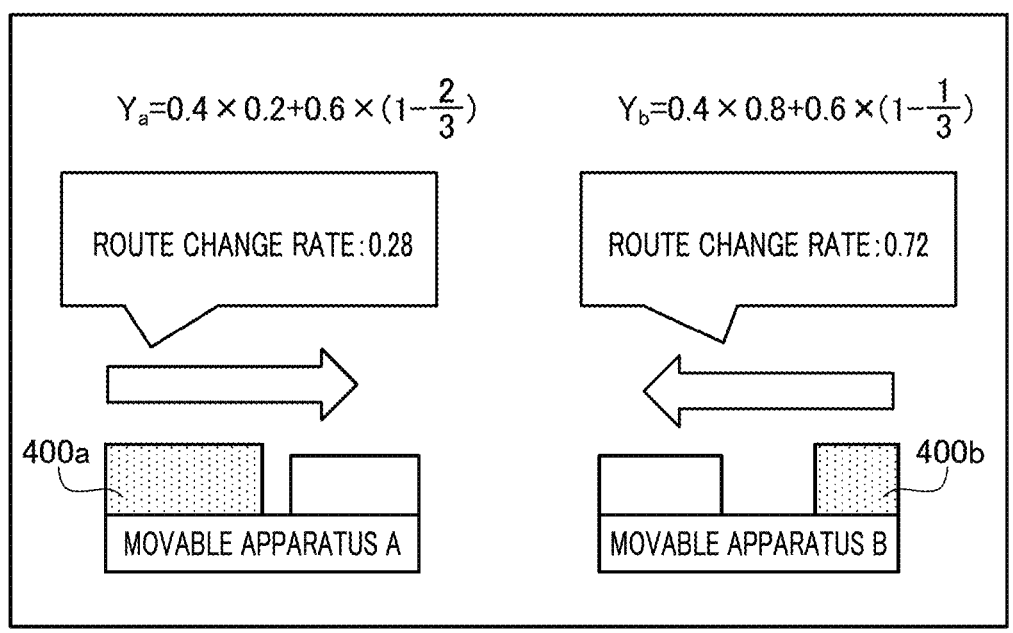
FIG. 4 is a diagram for explaining an example when collision between a movable apparatus A and a movable apparatus B is detected.

An example of a method for the calculation will be described by using FIG. 4. FIG. 4 is a diagram for explaining an example when collision between a movable apparatus A and a movable apparatus B is detected and represents a situation in which the movable apparatus A and the movable apparatus B have determined each other as movable apparatuses as targets of collision.

Ya and Yb in the drawing represents a route change rate of the movable apparatus A and a route change rate of the movable apparatus B, respectively. Also, 400*a* denotes a load of the movable apparatus A, 400*b* denotes a load of the movable apparatus B, and FIG. 4 illustrates an example in which the loading amount and the weight of the load 400*a* are greater than those of the load 400*b*.

Details of the method for calculating the route change rate will be described later by using Expression 2 in description of Step S304. In the drawing, a specific example in which a value described in the specific example column of each variable illustrated in FIG. 6, which will be described later, is substituted to Expression 2, which will be described later, is illustrated as a specific example of calculating Ya and Yb.

In the situation illustrated in FIG. 4, a total distance by which the movable apparatus is to move away from the current route in order to pass by the movable apparatus as a target of collision is calculated by using Expression 1 below, for example.

$$L = (Wa + Wb)/2 + \alpha \quad \text{(Expression 1)}$$

In Expression 1, L denotes a total distance of the distances by which the movable apparatus A and the movable apparatus B are to move away from the current routes in order to pass by the movable apparatus as a target of collision. Wa denotes a vehicle width of the movable apparatus A, Wb denotes a vehicle width of the movable apparatus B, and a denotes a fixed value set in advance and is set as a margin (gap) between Wa and Wb when they pass by each other.

The distance L is calculated in order to pass by the movable apparatus as a target of collision by using Expression 1. The distance L by which the movable apparatus is to move away from the current route may be calculated by a method other than this, and for example, a sufficient distance by which the movable apparatuses operating in the same environment can pass by each other may be set in advance and used, for example.

In Step S304, the change rate calculation unit 204 calculates the route change rate by using the information regarding the movable apparatus as a target of collision acquired in Step S302. The route change rate represents a proportion at which each movable apparatus is to move away from each route with respect to the distance L by which the movable apparatus is to move away from the route calculated in Step S303. Therefore, calculation is made such that a sum of the route change rates calculated by the movable apparatus and the movable apparatus as a target of collision is one.

A method of adding up weighted results of variables (parameters) will be described as a method of calculating the route change rate in the first embodiment. In the first embodiment, calculation is performed by using Expression 2 below, for example. Yx denotes the route change rate.

$$Yx = dt \times Tx + dc \times (1 - Cx) \quad \text{(Expression 2)}$$

x denotes a label, and the route change rate of the movable apparatus A is represented as Ya. dt denotes a weight coefficient to be applied to priority of a task. Tx denotes a ratio of priority of tasks of the own and the different movable apparatus, and a priority ratio of the task of the movable apparatus A is represented as Ta, for example.

dc denotes a weight coefficient to be applied to the loading amount. Cx denotes a ratio between the loading amounts of the own movable apparatus and the different movable apparatus, and a ratio of the loading amount of the movable apparatus A is represented as Ca, for example. Here, Step S304 functions as a change rate acquisition step of acquiring the route change rate on the basis of the different movable apparatus information and the own movable apparatus information.

In this manner, the route change rate is acquired through a weighting operation using, as parameters, information included in the different movable apparatus information and the own movable apparatus information in the first embodiment. At that time, the change rate is acquired by performing the weighting operation on ratios of the parameters.

Note that it is possible to enhance work efficiency since the route change rate is set to be smaller as the task priority ratio is smaller or the loading amount is larger in the first embodiment. A specific example of the calculation of the change rate will be described by using FIGS. 5 and 6 and Expression 2.

FIG. 5 is a diagram illustrating an example of information regarding the movable apparatuses A and B, and the information regarding the movable apparatus A and the movable apparatus B is described in each row in FIG. 5. In the task priority column, priority of the current task of each of the movable apparatus A and the movable apparatus B is described. In the loading amount column, the current loading amount of each of the movable apparatus A and the movable apparatus B is described.

FIG. 6 is a diagram illustrating a specific example of variables (parameters) used to calculate the route change rate, and an example of a specific value of each variable to be used in the expression for calculating the route change rate expressed by Expression 2 is described in each row in FIG. 6. A name of each variable is described in the name column, a symbol representing each variable in the expression expressed as Expression 2 is described in the variable column, and a specific example of each variable is described in the specific value column.

dt in the "weight for task priority" row is a weight to be applied to priority of a task set in advance. dc in the "weight for loading amount" row is a weight to be applied to a loading amount set in advance.

Ta in the "task priority ratio" row denotes a task priority ratio with respect to the movable apparatus as a target of collision for the movable apparatus A. As illustrated in FIG. 5, task priority of the movable apparatus A is 1, task priority of the movable apparatus B as a target of collision for the movable apparatus A is 4, and the priority ratio Ta is 1/(1+4)=0.2. Tb denotes a priority ratio of the task with respect to the movable apparatus A that is a target of collision for the movable apparatus B.

According to a calculation method similar to that for the task priority ratio of the movable apparatus A as described above, the task priority ratio Tb of the movable apparatus B is 4/(1+4)=0.8. Ca in the "loading amount ratio" row denotes a ratio of the loading amount (weight) with respect to the movable apparatus as a target of collision for the movable apparatus A.

As illustrated in FIG. 5, the loading amount of the movable apparatus A is 10, the loading amount of the movable apparatus B as a target of collision for the movable apparatus A is 5, and the ratio Ca is 10/(10+5)=2/3. Cb denotes a ratio of the loading amount with respect to the movable apparatus A that is a target of collision for the movable apparatus B. According to a calculation method similar to that for the ratio of the loading amount of the movable apparatus A as described above, the ratio Cb of the loading amount of the movable apparatus B is 5/(10+5)=1/3.

Although the weight Dt regarding task priority is set to 0.4 and the weight for the loading amount is set to 0.6 in this example, the present invention is not limited thereto. Which of the parameters the weights are to be applied and how much weights are to be applied thereto may be set in advance on the basis of how much each parameter is to be considered important.

However, the total value of the weight of each parameter is set to be 1 such that a sum of the change rates of the routes of the movable apparatus A and the movable apparatus B is one. The result of calculating the route change rate for each of the movable apparatus A and the movable apparatus B by using the variables described in Expression 2 and FIG. 6 is described in the upper part of each movable apparatus in FIG. 4. In other words, the route change rate Ya of the movable apparatus A is 0.28, while the route change rate Yb of the movable apparatus B is 0.72.

Although the method of calculating the route change rate by performing calculation by applying the weight to each of the task priority and the loading amount as described in Expression 2 has been described as an example in the first embodiment, the present invention is not limited thereto. A time required to change the route, a task type, information regarding fuel efficiency, a wear rate (wear-out rate), or the like may be used as a variable (parameter) as well as the task priority and the loading amount to perform the weighting operation.

Although the two parameters are used for the calculation in the first embodiment, the present invention is not limited thereto. More parameters than two may be used, or less parameters may be used. Although the weight is applied to the ratios of the parameters such as the task priority and the loading amount with respect to the movable apparatus as a target of collision and the route change rate is calculated on the basis of the result thereof in the first embodiment, the present invention is not limited thereto.

For example, the route change rate may be determined on the basis only of the ratio of the parameter with respect to the movable apparatus as a target of collision. In such a case, an average value of the ratio of the task priority and the ratio of the loading amount may be used as an avoidance rate, for example. Also, in a case of one parameter, the ratio of the parameter may be used as a route change rate. Alternatively, the determination may be made on the basis of simple comparison of used parameters.

In that case, the determination may be made on the basis of a rule of referring to an avoidance rate set in advance, for example, the avoidance rate of 1 for the movable apparatus with a smaller parameter than that of the movable apparatus as a target of collision, the avoidance rate of 0 for the movable apparatus with a larger parameter than that of the movable apparatus as a target of collision, or the like.

In Step S305, the moving route determination unit 205 determines a moving route to be changed by using the distance L by which the movable apparatus is to move away from the route calculated in Step S303 and the change rate calculated in Step S304. As a method for changing the route, the amount of avoidance is determined by multiplying the distance L calculated on the basis of Expression 1 in Step S303 first by the route change rate calculated in Step S304, for example.

As for the movable apparatus A illustrated in FIG. 4, for example, the route change rate calculated in Step S304 is 0.28, and L×0.28=0.28 L for the distance L calculated in Step S303 is the amount of avoidance of the movable apparatus A. Similarly, the amount of avoidance of the movable apparatus B is 0.72 L.

In Step S305, the point separated from the route by the aforementioned amount of avoidance from the predicted collision position where collision of the movable apparatus A and the movable apparatus B is predicted to occur as determined in Step S301 is regarded as a target point, and the route is changed to move from the current position to the target point.

Note that the above description is an example, and the present invention is not limited thereto. For example, the target point may be installed by using only the distance L calculated in Step S303. Also, the distance L may be set in advance, and the setting value may be used as the amount of avoidance. Moreover, the amount of avoidance may be determined by multiplying the distance L set in advance by the change rate. Note that Step S305 functions as a moving route determination step of determining a moving route to be changed on the basis of the route change rate calculated in Step S304 as the change rate acquisition step.

Second Embodiment

In the first embodiment, the moving route determination unit 205 is used to determine the moving route for avoiding collision. In the second embodiment, a movable apparatus is controlled to travel along a moving route for avoiding collision determined by using a moving route determination unit 205 by including a moving control unit 701 in addition to the configuration in the first embodiment.

Figure 7:
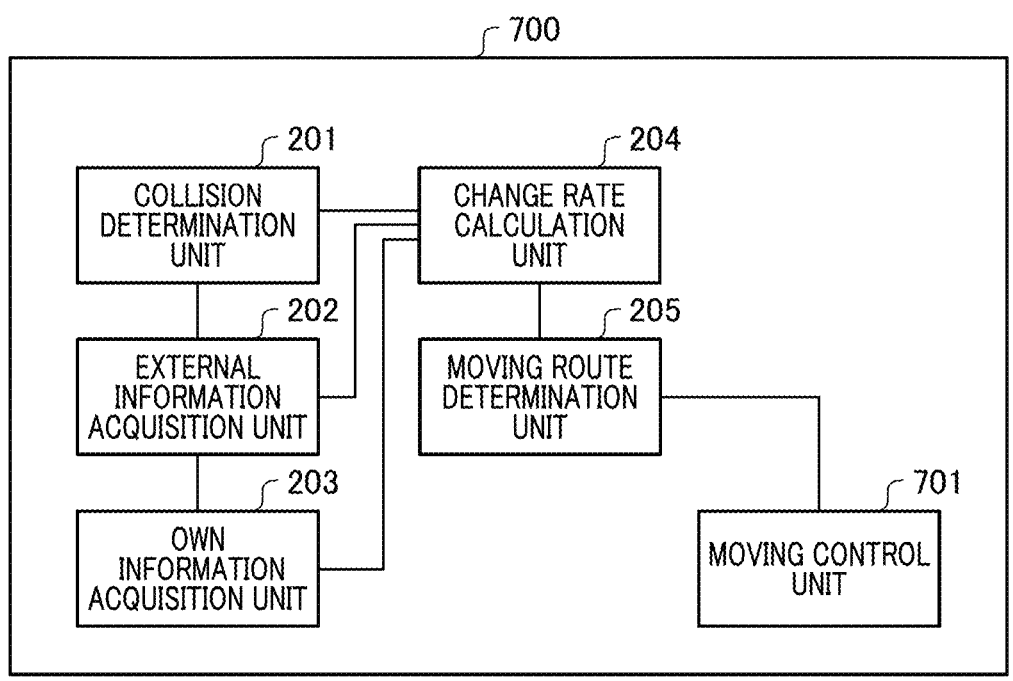
FIG. 7 is a functional block diagram illustrating a configuration example of an information processing device according to a second embodiment.

A configuration related to the second embodiment will be described by using FIG. 7. FIG. 7 is a functional block diagram illustrating a configuration example of an information processing device according to the second embodiment. An information processing device 700 according to the second embodiment is achieved by adding the moving control unit 701 to the configuration of the information processing device 200 described in the first embodiment.

The moving control unit 701 controls movement of a movable apparatus by using information regarding a moving route for avoiding collision determined by the moving route determination unit 205. Specifically, the movable apparatus is controlled to move along the route determined in Step S305. In other words, the moving control unit 701 controls the own movable apparatus such that the own movable apparatus moves along the route determined by the moving route determination unit 205.

Third Embodiment

In the first embodiment, the moving route for avoiding collision is determined by using the moving route determination unit 205. In the third embodiment, a notification of a moving route for avoiding collision determined by using a moving route determination unit 205 is provided to the outside by including an information presenting unit in addition to the configuration in the first embodiment.

Figure 8:
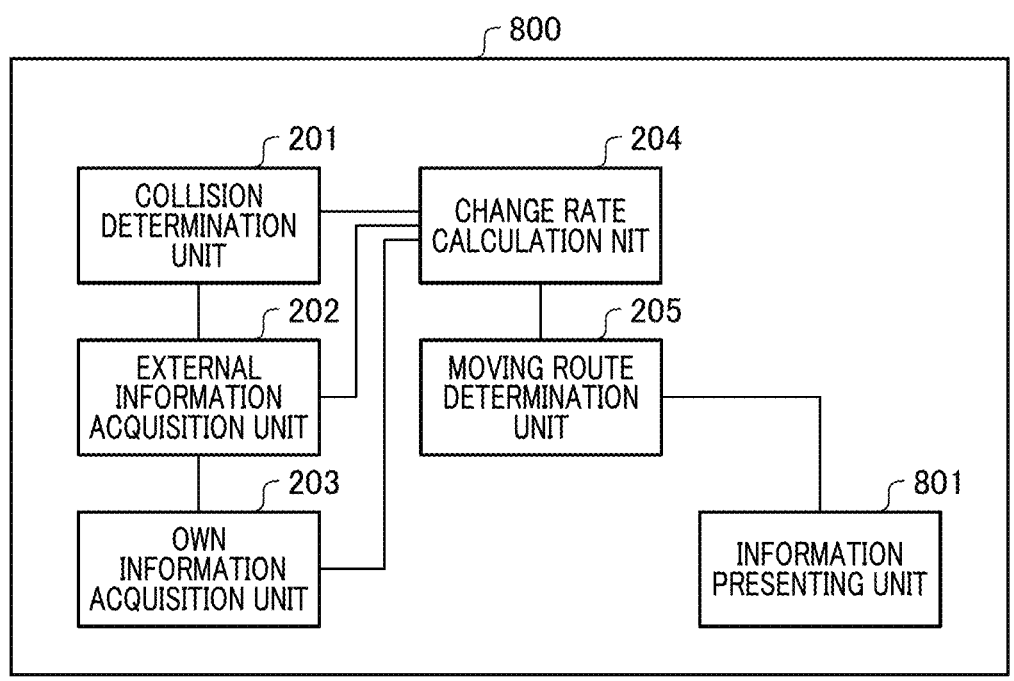
FIG. 8 is a functional block diagram illustrating a configuration example of an information processing device according to a third embodiment.

FIG. 8 is a functional block diagram illustrating a configuration example of an information processing device according to the third embodiment. An information processing device 800 according to the third embodiment is achieved by adding an information presenting unit 801 to the configuration of the information processing device 200 described in the first embodiment.

The information presenting unit 801 presents, to the outside, information regarding a moving route for avoiding collision determined by the moving route determination unit 205. As a method for the presentation, sound may be used, for example, to notify the surroundings of the fact that the route is to be changed and which way the movable apparatus is to move. Also, an indicator indicating a moving direction of a vehicle may be used to indicate a direction to which the route is to be changed. Additionally, a central management device may be notified of information, and the information may be presented by using a user interface (UI).

Note that the example in which the present invention is applied to an autonomous movable apparatus has been described in the aforementioned embodiments. However, the movable apparatus in the examples is not limited to the autonomous movable apparatus such as an automated guided vehicle (AGV) or an autonomous mobile robot (AMR). Also, the movable apparatus may be one that is used in a driving assistance manner rather than in a completely autonomously moving manner.

Also, the movable apparatus may be any movable apparatus as long as the movable apparatus moves, such as an automobile, a train, a ship, an aircraft, a robot, or a drone, for example. Additionally, at least a part of the information processing system in the examples may be mounted in the movable apparatus or may not be mounted therein. Moreover, it is also possible to apply the present invention to a case where the movable apparatus is remotely controlled.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the information processing device through a network or various storage media. Then, a computer (or a CPU, an MPU, or the like) of the information processing device may be configured to read and execute the program. In such a case, the program and the storage medium storing the program configure the present invention.

Moreover, the present invention also includes implementation by using at least one processor or circuit configured to function of the embodiments explained above, for example. Note that a plurality of processors may be used and caused to perform distributed processing.

This application claims the benefit of Japanese Patent Application No. 2022-200963, filed on Dec. 16, 2022, which is hereby incorporated by reference herein in its entirety.

What is claimed is:

1. An information processing device mounted in a movable apparatus, the information processing device being configured to determine a route for avoiding collision of the movable apparatus, the information processing device comprising at least one processor or circuit configured to function as:
    a determination unit configured to determine a different movable apparatus as a target of collision;
    a different movable apparatus information acquisition unit configured to acquire different movable apparatus information that includes at least one of shape information, a current state, a performance, and information of a task that is being performed of the different movable apparatus, and information of a route along which the different movable apparatus is moving;
    an own movable apparatus information acquisition unit configured to acquire own movable apparatus information regarding an own movable apparatus corresponding at least to the different movable apparatus information;
    a change rate acquisition unit configured to acquire a change rate of the route on the basis of the different movable apparatus information and the own movable apparatus information; and
    a moving route determination unit configured to determine a moving route to be changed on the basis of the change rate of the route acquired by the change rate acquisition unit,
    a moving control unit configured to control the own movable apparatus such that the own movable apparatus moves along the route determined by the moving route determination unit,
    wherein the change rate acquisition unit acquires the change rate by a weighting operation using, as parameters, information included in the different movable apparatus information and the own movable apparatus information, and
    wherein the change rate acquisition unit acquires the change rate by performing a weighting operation on ratios of the parameters.

2. The information processing device according to claim 1, wherein the current state includes information regarding at least one of a loading amount, a battery remaining amount, and a fuel remaining amount.

3. The information processing device according to claim 1, wherein the performance includes information regarding at least one of a horsepower and fuel efficiency.

4. The information processing device according to claim 1, wherein the information regarding the task includes priority of the task.

5. The information processing device according to claim 1, wherein the shape information includes information regarding at least one of a width, a height, and a total length of the movable apparatus.

6. The information processing device according to claim 1, wherein the at least one processor or circuit is further configured to function as,
    an information presenting unit configured to present the route determined by the moving route determination unit to outside.

7. A movable apparatus comprising at least one processor or circuit configured to function as:
    a determination unit configured to determine a different movable apparatus as a target of collision;
    a different movable apparatus information acquisition unit configured to acquire different movable apparatus information including at least one of shape information, a current state, a performance, and information regarding a task that is being performed of the different movable apparatus, and information regarding a route along which the different movable apparatus is moving;
    an own movable apparatus information acquisition unit configured to acquire own apparatus information regarding an own apparatus corresponding at least to the different movable apparatus information;

a change rate acquisition unit configured to acquire a change rate of the route on the basis of the different movable apparatus information and the own movable apparatus information;

a moving route determination unit configured to determine a moving route to be changed on the basis of the change rate of the route acquired by the change rate acquisition unit; and a moving control unit configured to control the own movable apparatus such that the own movable apparatus moves along the route determined by the moving route determination unit, wherein the change rate acquisition unit acquires the change rate by a weighting operation using, as parameters, information included in the different movable apparatus information and the own movable apparatus information, and wherein the change rate acquisition unit acquires the change rate by performing a weighting operation on ratios of the parameters.

8. An information processing method for determining a route for avoiding collision of a movable apparatus;

determining a different movable apparatus as a target of collision;

acquiring different movable apparatus information that includes at least one of shape information, a current state, a performance, and information regarding a task that is being performed of the different movable apparatus, and information regarding a route that the different movable apparatus is moving;

acquiring own movable apparatus information that is information regarding an own movable apparatus corresponding at least to the different movable apparatus information;

acquiring a change rate of the route on the basis of the different movable apparatus information and the own movable apparatus information;

determining a moving route to be changed on the basis of the change rate of the route acquired by the acquiring of the change rate, causing the movable apparatus to move along the determined moving route, wherein the change rate is acquired by a weighting operation using, as parameters, information included in the different movable apparatus information and the own movable apparatus information, and wherein the change rate is acquired by performing a weighting operation on ratios of the parameters.

9. A non-transitory computer-readable storage medium storing a computer program including instructions for executing following processes:

determining a different movable apparatus as a target of collision;

acquiring different movable apparatus information that includes at least one of shape information, a current state, a performance, and information regarding a task that is being performed of the different movable apparatus, and information regarding a route that the different movable apparatus is moving;

acquiring own movable apparatus information that is information regarding an own movable apparatus corresponding at least to the different movable apparatus information;

acquiring a change rate of the route on the basis of the different movable apparatus information and the own movable apparatus information;

determining a moving route to be changed on the basis of the change rate of the route acquired by the acquiring of the change rate, causing the movable apparatus to move along the determined moving route, wherein the change rate is acquired by a weighting operation using, as parameters, information included in the different movable apparatus information and the own movable apparatus information, and wherein the change rate is acquired by performing a weighting operation on ratios of the parameters.

* * * * *